Jan. 7, 1969  M. BERGER  3,421,002

THIN FILM MAGNETIC LIGHT MODULATOR

Filed May 27, 1964

MARTIN BERGER INVENTOR

BY George M. Gould

PATENT ATTORNEY

United States Patent Office

3,421,002
Patented Jan. 7, 1969

3,421,002
THIN FILM MAGNETIC LIGHT MODULATOR
Martin Berger, East Brunswick, N.J., assignor to Esso Research and Engineering Company, a corporation of Delaware
Filed May 27, 1964, Ser. No. 370,643
U.S. Cl. 250—199                                11 Claims
Int. Cl. H04b 9/00

The present invention relates to an improved apparatus having the ability to transmit varying quantities of electromagnetic radiation in accordance with externally applied electrical quantities such a voltage, current, electric field, electron beam, and the like, which are converted into a magnetic field. This apparatus is referred to as an electromagnetic radiation modulator or valve.

In particular, the present invention relates to an improved thin film light modulator or valve apparatus which can regulate light transmission and methods and techniques for using said thin film electromagnetic radiation modulator or valve and its special version which is a light modulator or valve. Use of this thin film light modulator technique allows the construction of large uni- or omnidirectional modulators as well as small high frequency modulators, which types of modulators were not possible under previously known light modulation techniques utilizing a magnetic liquid polymer modulator.

In coassigned, copending cases, Ser. No. 176,131, filed on Feb. 27, 1962 and now abandoned, Ser. No. 201,260, filed on June 11, 1962 and now abandoned, Ser. No. 332,302, now Patent No. 3,278,441, and Ser. No. 336,339, filed on Jan. 2, 1964, now Patent No. 3,328,110, it was disclosed that a dilute, colloidal solution of a ferromagnetic material in a solvent can be used to vary the transmission of electromagnetic radiation, such as light, by impressing a variable, magnetic field on the dilute, colloidal solution. One practical utilization of this discovery is in the transmission of information over light beams. In particular, ferromagnetic polymers can be used in colloidal solution as an element of the apparatus of the discovery.

The chainlike structure of these ferromagnetic polymers affects light in a manner which cannot be reconciliated with the usual theories concerning the interaction of colloidal particles with light. In an appropriate solvent, the chainlike structure probably exists as a coil. in the presence of a magnetic field, however, the coil is distorted or "oriented." Depending on this orientation and the direction of the electric vector of the light wave, the transmission of light through the liquid is either enhanced, attenuated or, in a special case, not changed at all. At first glance, this would appear to be a scattering phenomenon. However, scattering would demand a strong dependence of this effect on the wave length of light. No such effect has been found. The interaction of the metal polymer and light is not effected by the wave length of the light. In general, the size of the metal polymer particle is much too small for a pure geometric mechanism (such as a "venetian blind effect"). Thus, it is not possible to say just what the pertinent mechanism is.

One of the most significant features of the above discovery is in the phenomenon that the transmission of light in the valve or modulator can be influenced quite markedly by the presence of very weak magnetic fields. For instance, colloidal solutions containing $3.4 \times 10^{-5}$ grams of iron per cc. of solution, having an average particle size of approximately 0.1 microns in size held in suspension in carbon tetrachloride show characteristics which are summarized in the following Table I.

TABLE I

| Magnetic field (in direction of light): | Light intensity (arbitrary units |
|---|---|
| 0 | 1 |
| 1 oersted | 1.12 |
| 2 oersteds | 1.22 |
| 3 oersteds | 1.33 |

These are very weak magnetic fields. For instance, a horseshoe magnet bought in a dime store with a length of about 3 inches at the center portion would have a magnetic field of about 10 to 20 oersteds.

The above technique was readily adaptable for use in relatively small modulating devices. In such use an inductance coil was employed for generating the necessary magnetic field. This inductance coil was wrapped around the outside of the cell containing the magnetic polymer liquid. In addition, the magnetic polymer liquid was diluted so as to have an iron content level of about 20–30 parts per million. This permitted adequate transmission of light through about 1 centimeter of liquid.

However, the configuration utilized in the small modulating devices described above is not suitable in larger units used for modulating large, e.g., 6 inches to 4 feet diameter, light sources. This is due to the fact that the inductance necessary to generate the appropriate magnetic field in an apparatus having an external magnetic coil configuration is very large e.g. 1–3 henries and thus would require extremely high voltages, e.g., 500–1000 volts, to generate the field. This would be particularly critical at high frequencies. Additionally, such a configuration as utilized in the small modulating devices could not be used for omnidirectional modulation.

It has now been found that by restricting the region in which a field must be present, it is possible to modulate light from relatively large sources. This is accomplished by utilizing a large-scale modulator or valve which uses more concentrated magnetic liquids than used for the small modulating devices decribed previously. It is further contemplated that these large-scale modulators or valves would be constructed of cells having a much reduced light path. The preferred range of concentration for the magnetic polymer liquid is 1% to 15%, more preferably about 3% to 10%, while the desired light path through the cell would be about $\frac{1}{16}$ to $\frac{1}{10,000}$ of an inch, most preferably $\frac{1}{100}$ to $\frac{1}{2000}$ of an inch.

A novel feature of the thin liquid magnetic polymer film light modulator or valve cell of the present invention resides in the "waffle" wire coil which is contained within the cell itself. In a particular preferred embodiment, two glass discs are utilized as the cell structure. A thin wire which runs back and forth across the disc surface in a "pleated" or "waffle" fashion is placed at the interface between the two discs. Additionally, a thin film of a concentrated solution of the magnetic polymer is placed on the interfacial surfaces of the two discs. The edges of the glass discs are then sealed by utilizing an appropriate adhesive, e.g., an epoxy cement. The ends of the wire should be allowed to protrude from the edge of the discs. The wire ends are then attached to a suitable amplifier-microphone system.

Thus, when a sound is picked up by the microphone and translated into an electrical signal through the amplifier system, the signal will pass through the glass discs by means of the "waffle" wire. This electrical signal will generate a magnetic field in the polymer liquid film and the cell will then modulate light passing through the liquid as described previously.

It is also contemplated that the "waffle" utilized in the cell be in the form of a printed circuit rather than the pleated wire described previously. Obviously, the printed circuit should be prepared in a manner that will not severely hamper the passage of radiation through the cell. This can be accomplished by using, for example, a transparent plastic sheet as the substrate for the circuit. Other modifications, will, of course, suggest themselves to one skilled in the art and the example given should not be taken as limiting the scope of the present invention.

The magnetic fields produced in adjacent spaces between the wire are 180° out of phase with each other; however, due to the symmetry in regard to modulation, this does not affect the modulation. Of course, the presence of the wire within this cell reduces the transmissibility of radiation passing through the cell but as long as the area of the wire is kept in the order of 50% of the total disc cross-sectional area this presents no problem.

If a minimal liquid film thickness is desired, e.g., about 1/5000 of an inch, it is necessary that the wire used be relatively thin. However, use of very thin wire increases the resistance of the wire to the current and thus generates undesired heat. Thicker wire can be utilized in the cell by grooving the interior surfaces of the glass discs so as to accommodate the thicker wire in a manner that allows the center of the wire to be at the cell disc's interface.

It has been found that a biasing magnetic field is necessary in light modulated voice communication for two reasons. Without a bias magnetic field the variation of light intensity does not follow the variation of the coil magnetic field. The second reason is that a biasing field amplifies the light variation over what it would be without a bias. Generally speaking, the magnetic strength of the biasing field should be approximately the same as that of the exciting field. It has now been found that biasing in the thin film magnetic polymer cell can be accomplished by utilizing direct current through the "waffle" wire, by use of an external permanent bias magnet or by use of another set of wires as an external solenoid coil.

The preparation of the magnetic polymers which are used as the thin films for the electromagnetic valve or modulator of the present invention is described fully in application Ser. No. 332,302, filed Dec. 20, 1963. The disclosure of said application is incorporated herein by reference. However, so much of the disclosure of said application will be repeated here as necessary to eliminate the necessity for constant referral to said Ser. No. 332,302. The invention of said Ser. No. 332,302 relates to the discovery that by using an excess of the metal carbonyl in the metal polymer preparation and by extending the duration of the treatment past the time required to secure metal complex formation, magnetic polymers can be obtained directly. It is believed that particles of the pure metal are attached to and grow from the metal carbonyl group located at the double bond. Furthermore, it has been additionally discovered that magnetic fluids having superior magnetic properties are obtained when the preparation of the magnetic fluid is carried out in the presence of a magnetic field greater than that of the earth. The field can be quite small. For instance, that exerted by a commercial laboratory magnetic stirring bar has been found to be sufficient.

In Ser. No. 201,260, the basic polymeric complex unit in the polymer was shown to be represented by the general formula:

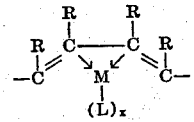

wherein M is a polyvalent heavy metal, particularly a transition metal such as iron, cobalt, and nickel; R comprises a substituent group like hydrogen and hydrocarbons, particularly $C_1$ to $C_3$ alkyl groups and combinations thereof; L is an electron donating ligand group bonded directly to the metal atoms such as carbonyls, hydrogen, hydrocarbons, and other ligand groups previously discussed; $x$ represents the number of ligand groups and depending upon the metal and the number of electrons shared by the ligand groups with the metal, can be a number from 1 to 4, such as 1, 2, 3 or 4, usually 3.

The unsatisfied valence bonds of the polymeric complex unit —R4C4ML$_x$— are satisfied by one or more of either other polymeric complex units as described, or by other ethylenically unsaturated or saturated hydrocarbon groups within the main or side chain, such as

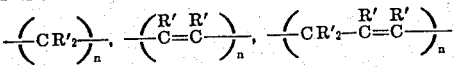

and the like wherein R' is a radical such as hydrogen and hydrocarbon radicals such as alkyl, aryl, alkylaryl, olefinic, cyclodiene radicals and $n$ is a number from 1 to 10, e.g., 2 to 8. Suitable examples include methylene, vinylene and vinylidene radicals. The complex unit can be interspersed within the other groups of the polymer in any combination such as in isolated, cumulative or conjugate positions. Of course, the ends of the polymer main or side chain and also the complex unit where this unit is on the end of the chain are terminated with the usual terminal end groups such as $CR'_3$, $CR'_2=CR'—$ and hydrogen. The exact amount and nature of the complex unit distribution within the polymers depends on the type of polymer, the degree of ethylenical unsaturation before and after the reaction, and other factors within the selection or control of the formulator skilled in the art.

In Ser. No. 201,260 it was disclosed that in the reaction between the polymer and the metal carbonyl compound, the isolated ethylenically unsaturated bonds are transposed to conjugate positions. For example, in the reaction between polybutadiene and iron carbonyl, the pair of remaining ethylenical bonds in two polymerized monomers is conjugated with the resulting structural formula of

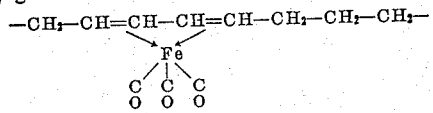

with the unsatisfied valences satisfied as before by the remaining portion of the polybutadiene structure such as by $C_4H_6$ groups or multiples thereof or by terminal groups such as $C_4H_7$ groups. The polybutadiene complex unit was also generally represented in Ser. No. 201,260 as

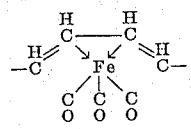

The method of said Ser. No. 332,302 gives particles which, together with polymer, are associated into chains, which may range up to four or five microns in length, or even longer. This phenomenon is possible only when the polymer contains complexed metal carbonyl groups. It is believed that the metal particles are held to the polymer chain through these groups. Iron carbonyl is the preferred carbonyl reactant. The basic polymeric complex unit in the polymers of the instant invention are represented by the formula:

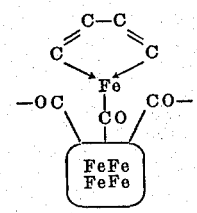

It can be seen that several additional Fe molecules form in a cluster on the internal iron carbonyl group. This is referred to herein as "clumping." The iron molecules are said to form "clumps." In the presence of a magnetic field, the iron particles and their associated polymer are formed into the chains observed. The presence of the chains imparts unusual magnetic properties. It is well known that elongated fine particles have superior magnetic properties (I. S. Jacobs & C. P. Bean, Physical Review, 100, 1060 (1955)). The chains of the invention are in effect such materials. Although the preferred compositions of the invention are the magnetic polymers having "clumps" of a metal, it will be understood that novel polymers having "clumps" of a metal can be prepared by omitting the magnetic field in their preparation. These polymers have a smaller degree of permanent magnetic character than do those prepared in the presence of a magnetic field and have utility as normal polymers where a large percent of metal content is desirable.

The magnetic liquids and solids of Ser. No. 332,302 can be prepared directly or from the metal carbonyl complexes of Ser. No. 201,260. It will be understood that, if prepared directly, the reaction will proceed via the reaction for the metal carbonyl complexes which is set forth in Ser. No. 201,260.

Generally, a solution of the metal complexed polymer in a solvent is heated at temperatures of from 100° to 300° C. for 12 to 120 hours in an inert atmosphere in the presence of excess metal carbonyl of the same or different metal as the carbonyl used to form the complex and in the presence of a magnetic field. The metal carbonyl can be added all at once or divided in several portions and added at intervals of several hours over the reaction time period. The resultant liquid contains a solution of the polymer and highly dispersed metal which is nonseparable under a strong magnetic field.

The solid iron-containing polymers can be separated from the solvent and excess carbonyl by simple vacuum distillation at room temperature which removes both solvent and excess carbonyl. The resulting solid polymers generally have iron contents ranging from 30 to 75 wt. percent of the total solid, although polymers containing a lesser amount of iron can be prepared.

The reaction conditions, solvents, reactants and the like set forth in Ser. No. 201,260 are, therefore, generally applicable and are set forth as follows. Polymers containing the best magnetic properties are those prepared with an excess of the carbonyl in the presence of a small magnetic field. Only the normal heating for the reaction is necessary. The magnetic field should be greater than that exerted by the earth and preferably from 2 to 10,000, more preferably 10 to 1,000 and most preferably 50 to 500 oersteds or more. The magnetic field can be either stationary or moving. Moreover, the magnetic field need not be applied continuously during the reaction. It can be applied at any time during the reaction for a time period less than the reaction time. The preferable time of application is toward the end of the reaction. It can also be applied during the entire reaction period without detriment.

The metal carbonyl polymer complexes of Ser. No. 201,260 are prepared by contacting the ethylenically unsaturated polymer either in bulk or in solution with the desired metal carbonyl compound in a nonoxidizing atmosphere or under nonoxidizing conditions. The quantity of the metal carbonyl to be employed depends in part upon the degree of unsaturation of the polymer and the desired amount of metal to be complexed with the polymer together with the desired characteristics and the proposed utility of the complexed polymers produced. The maximum quantity of metal carbonyl that can be complexed with the polymer can be determined stoichiometrically by the degree of polymer unsaturation, since each pair of carbon-to-carbon ethylenically unsaturated bonds is capable of complexing one mole of metal. Of course, the reaction can be carried out in situ during the polymerization, copolymerization or the dehydrogenation of a polymer or its monomers; and the reaction can be carried out with less than stoichiometric quantity of the metal carbonyl, where a high metal content is undesirable or not required. Regardless of the quantity of metal carbonyl employed, subsequent vulcanization or curing of the metal carbonyl complexed polymer can be accomplished, whether there exist complex, conjugated, unsaturated bonds or free, unsaturated bonds in the polymer.

In Ser. No. 201,260 it was disclosed that concentration of the metal carbonyl should generally exceed 10 wt. percent or catalytic quantities since these lower amounts are normally ineffective to form sufficient metal complexed polymer for most requirements. Of course, the exact concentration of the metal carbonyl will vary, subject to selection but the preferred amount of metal carbonyl for the present invention based on the weight of the monomeric polymer unit or copolymer unit in the polymer should be a major amount of 50 wt. percent or more, with from 100 to 800, e.g., 150 to 500, weight percent or even higher concentrations often required in the reaction. The weight percent of metal carbonyl used will depend on the degree of unsaturation of the polymer and the molecular weight of the polymer. These concentration limits for the complex of Ser. No. 201,260 may be generally expressed as at least 0.15 or from 0.25 to 2.50, e.g., 0.40 to 1.5, moles of metal carbonyl per mole of ethylenical unsaturation in the polymer for preparation of the complex of Ser No. 201,260. The quantity of the metal carbonyl and metal complexed with the polymer is usually determined by analysis of the infrared spectra of polymer samples or by conventional combustion analysis methods. For preparation of the magnetic materials of Ser. No. 332,302 which are useful in the valve of the invention the carbonyl is used in large excess. For instance, from 10 to 200, preferably 40 to 150, and most preferably about 85 to 115 parts by weight of metal carbonyl per part of polymer can be used.

These concentrations for the reaction can be expressed as 2 to 55, preferably 2.51 to 55, more preferably 11 to 41, and most preferably 23 to 32 moles of metal carbonyl per mole of ethylenic unsaturation. This is a total amount and, if the intermediate product, i.e., the complex of Ser. No. 201,260 has already been prepared, then the amount of metal carbonyl found in the complex should be taken into account. It is almost a negligible amount compared to the excess carbonyl that must be reacted with it to form the "clump" type polymers.

In general, the reaction between the metal carbonyl and the polymer to form the complex polymer or between the metal carbonyl and the complex polymer proceeds over a wide range of temperatures, preferably 30° to 150° C., but efficient reaction rates require elevated temperatures of over 70° C. with temperatures of 80° to 130° C., generally preferred. For iron carbonyl, the temperature is preferably from about 100° to 150° C. For cobalt carbonyl or nickel carbonyl, temperatures of 20° C. to 90° C. are satisfactory.

The reaction at lower temperatures proceeds without significant degradation in the molecular weight of the polymer. But as the reaction temperature increases, the depolymerization of the polymer increases.

The reaction may be carried out at elevated temperatures with the polymer in bulk or in solution, e.g., in hydrocarbon solvents, where degradation of the polymer is of insignificant importance. Where maintenance of the polymer molecular weight is desired, the reaction is preferably carried out in solvent solutions of, or containing, polar protective solvents.

The time for the completion of the complexing reaction depends upon the reaction temperature selected, the metal carbonyl employed, the amounts of reactants and other preselected reaction conditions. The time may vary from one hour to 72 hours, e.g., 2 to 24 hours. However, at the preferred elevated temperatures of above 70° C., the reaction normally is complete in 2 to 6 hours. For the magnetic polymer reaction the time is from 15 to 120 hours, preferably 24 to 96, and most preferably about 60 to 80 hours.

It will be noted that the ranges for time and quantity of carbonyl for the complex polymer and the magnetic polymer overlap to some extent. However, at the said temperatures of preparation, the time of formation of the complex polymers is orders of magnitude less than the time required for the "clumped" strongly magnetic and mildly magnetic polymers of this invention. The overlap of the carbonyl reactant is only in the 2 to 2.5 moles of carbonyl per mole of ethylenic unsaturation in the polymer.

To prevent polymerization and gelation of the polymer during the reaction, a nonoxidizing atmosphere and condition is maintained in the reaction vessel. Gelation is usually prevented by employing a blanket of an inert gas such as nitrogen, helium, carbon monoxide, rare gases, and the like over the polymer after the reaction zone or vessel has been swept clear of air or oxidizing compounds and gases. The reaction proceeds at atmospheric pressures but pressures of from 0.1 to 10 atmospheres or higher or lower may optionally be used.

In one embodiment of the invention, a protective polar organic solvent is employed either alone or with a hydrocarbon polymer solvent to protect the polymer from molecular weight degradation at elevated temperatures. In this manner, rapid reaction rates without significant molecular weight degradation can be obtained. Any polar solvent having more polarity than a hydrocarbon, such as heptane, and other than an acid, acid anhydride or acid chloride, may be employed with those saturated organic solvents containing carbon, hydrogen and oxygen or containing one or more keto, ether, or hydroxyl groups being preferred protective solvents.

It has been found that, in general, the presence or absence of the polar protective solvent determines the relative coercivity of the resulting magnetic polymer. Thus, omission of the polar protective solvent generally results in polymers with a relatively low value of magnetic coercivity while the presence of the polar protective solvent generally results in magnetic polymers having a relatively high degree of coercivity. For some unknown reason, there are from time to time exceptions to the above general discussion on coercivity. Thus, some magnetic polymers prepared in the absence of polar solvents but having high coercivity values have been obtained.

The term "coercivity" as used herein refers approximately to the degree of residual magnetism of the magnetic polymers. High coercivity donates a relatively high degree of residual magnetism after a magnetic field has been removed. Low coercivity denotes a low degree of residual magnetism after a magnetic field has been removed. There are many uses where low coercivity is desired and, conversely, there are many other uses where high coercivity is equally desirable.

The protective solvent employed should be wholly, or partially miscible with the unsaturated polymer or the polymer solution and may, in certain cases, function as both the polymer solvent and the protective solvent, such as in the case of ethers like 1,3-dialkoxy alkanes such as 1,3-dimethoxy ethane. Dioxane (1,4-diethylene dioxide) is a particular preferred protective solvent.

The protective solvent when employed in combination with a hydrocarbon solvent normally comprises from 1 to 30 volume percent of the solution, e.g., 1 to 10 volume percent. Suitable nonlimiting examples of polar solvents include those substituted and unsubstituted, saturated and unsaturated, $C_1$ to $C_{30}$ aliphatic, alicyclic, aromatic, heterocyclic and alkyl-aromatic solvents such as cyclohexanol; alkanols like methanol, ethanol, tert.butanol; alkyl aromatic alcohols like benzyl alcohol; glycols like propylene glycol, hexylene glycol; ketones like acetone, cyclohexanone; ethers like alkyl and aromatic ethers such as ethyl ether, phenyl ether; aldehydes like benzaldehyde, acetaldehyde; esters like carboxylic esters such as benzyl acetate, tert.butyl acetate and the like, and mixtures and combinations thereof.

The process of preparing the intermediate polymeric complexes of Ser. No. 201,260 and metal-containing polymers of the invention of Ser. No. 332,302 may be added if desired, by the employment of high energy and actinic sources to wholly or partially replace the use of heat. Thus, gamma irradiation or ultraviolet irradiation, e.g., in the range of 1850 to 5500 Angstroms may be used alone or in combination to effect the reaction of the metal carbonyl and the polymer. Further, the metal carbonyl, besides being added directly to the polymer as a liquid or solid, can be employed in the gaseous form either as a gas or sublimate vapor. In this situation, any liquid-gas or solid-gas contacting means can be employed such as a sparger beneath the surface of the polymer solution, or column contacting means whereby a stream of metal carbonyl gases is employed in a current or countercurrent direction to the polymer or polymer-containing solution.

A preferred embodiment of the invention comprises adding the unsaturated polymer to a solution comprising a hydrocarbon solvent, and in some instances, a polar solvent and, optionally, other conventional additives, sweeping the reaction vessel with nitrogen to remove air, adding the metal carbonyl to the polymer solution, heating the solution to 70° C. to 130° C. while subjecting it to a magnetic field of 10 or more oersteds for about 72 hours. The resulting magnetic liquid can be used as is or a magnetic polymer can be recovered by precipitating the polymer in a polar precipitation nonsolvent for the polymer, such as an alcohol, ketone and the like, for example, an aliphatic alcohol.

The starting polymers employed for the alternate production of magnetic fluids are those homo- or copolymers containing some degree of carbon-to-carbon ethylenical unsaturation. The unsaturation may be either in the main chain of the polymers such as present in head-to-tail polymerization methods, and as characterized by natural and synthetic elastomers like butyl rubber, or in the side chains of the polymers such as present in 1, 2 polymerization as characterized by vinyl polybutadiene and 3, 4 addition in polyisoprene. The ethylenically unsaturated bonds can also be present in both the main and the side polymer chains.

The degree of unsaturation of the polymers may vary between 0.5 to 99.5 mole percent such as between 0.5 and 50 mole percent, e.g., 1 to 30 or 1 to 10 mole percent, for those low unsaturated polymers and between 50 and 99 mole percent, e.g., 50 to 85 or 60 to 80 mole percent, for those highly unsaturated polymers.

The unsaturated linkages in the polymer can be conjugated, isolated, or cumulative, or any mixture or combination of these structural arrangements. The polymers prior to the complexing reaction can be partially vulcanized with conventional curing agents or copolymerized with other polymerizable monomers or polymers provided only that at the time of reaction with the metal carbonyl compound there remains some degree of carbon-to-carbon, ethylenical unsaturation within the polymer chain or molecule.

The polymers within the scope of the instant discovery may be broadly characterized as those ethylenically unsaturated polymers having an average molecular weight of from 1,000 to 3,000,000, preferably 100,000 to 800,000, most preferably 100,00 to 300,000, or higher or lower, and having Wijs iodine numbers of from 1 to 600, e.g., 1 to 50, for the low unsaturation polymers and over 100, e.g., 200 to 400, for the highly unsaturated polymers. All molecular weights are viscosity-average unless otherwise indicated.

Particularly suitable polymers and elastomers include those ethylenically unsaturated hydrocarbon rubbery polymers capable of cross linking or vulcanization and being elastic in character. Nonlimiting examples of unsaturated polymers suitable for the purposes of the invention include:

(1) Copolymers containing a major amount of an isoolefin and a minor amount of a multiolefin. These copolymers are commonly known as "butyl rubber" with their preparation and uses being described in U.S. Patent 2,356,128 to Thomas et al. This rubber normally comprises from about 85 to 99.5 weight percent of a $C_4$ to $C_8$ isoolefin such as isobutylene, or a $C_1$ to $C_3$ alkyl substituent like 2-methyl-1-butene, and from 0.5 to 15.0 weight percent of a $C_4$ to $C_{14}$ multiolefin or preferably a $C_4$ to $C_6$ multiolefin such as dimethylallyl, a cyclic diene like cyclopentadiene and cyclohexadiene, or more preferably a conjugated diene like isoprene, 1,3-butadiene, or a hydrocarbon substituted, e.g., an alkyl substituted, conjugated diene like dimethyl butadiene and the like. The rubbery reaction product of isobutylene and isoprene is particularly preferred. These butyl rubber polymers described commonly have Wijs iodine numbers of from 1 to 50 and from 0.5 to 10.0 mole percent unsaturation.

(2) Copolymers of a diene and a vinyl aromatic generally known as GR-S or SBR type rubbers commonly made by copolymerizing from 30 to 80 weight percent of a $C_4$ to $C_8$ conjugated diene such as butadiene, isoprene, or a cyclic diene such as cyclopentadiene or cyclohexadiene and a hydrocarbon substituted, e.g., an alkyl substituted, diene such as dimethyl butadiene with from 70 to 20 weight percent of a vinyl aromatic such as styrene, dimethyl styrene and alkyl substituted vinyl aromatics like divinyl benzene and the like, the preferred copolymer being that reaction product of about 70 to 80 weight percent of butadiene with about 20 to 30 weight percent of styrene.

(3) Polydienes such as those hydrocarbon polymers prepared by the homopolymerization of conjugated dienes like butadiene, isoprene, cyclic dienes like cyclopentadiene and their hydrocarbons and particularly $C_1$ to $C_3$ alkyl substituted dienes.

(4) Copolymers prepared by copolymerizing major amounts of from 50 to 98 weight percent, e.g., 60 to 80 weight percent, of a $C_4$ to $C_8$ cyclic or straight chain diene such as butadiene, isoprene, cyclopentadiene, hexadiene and the like with minor amounts of from 2 to 40 weight percent of a $C_2$ to $C_6$ monoolefin like ethylene, propylene, diisobutylene, isobutylene, pentene and the like.

(5) Natural rubber and natural rubber latexes such as those natural elastomeric products derived from the latex of the Hevea and Ficus species. These products are characterized by a high level of unsaturation, rubbery like characteristics and commonly have Wijs iodine numbers of above 200, such as from 200 to 400 or even higher.

These copolymers and homopolymers described above may be copolymerized further with minor amounts, such as from 1 to 30 weight percent, of organic polymerizable monomers or other polymerizable polymers containing one or more vinyl, vinylene, or vinylidene groups such as vinyl aromatics like styrene, divinyl benzene; vinyl cyanides like acrylonitrile, ethacrylonitrile; vinyl esters like the vinyl esters of short chain fatty acids, e.g., vinyl acetate, long chain fatty alcohol esters of acrylic acid and $C_1$ to $C_3$ alkyl substituted acrylic acid; halogenated vinyl compounds like vinylidene chloride, vinyl chloride, chloroprene, ethylene dichloride and the like.

The polymer types described above with the exception of the butyl rubber are commonly referred to as high unsaturation polymers having at least 30 mole percent of unsaturation such as from 50 to 99 mole percent unsaturation.

Unsaturated polymers and particularly those polymers described above can be reacted with the desired metal carbonyl either in bulk or in solution. In order to assure a rapid reaction rate and intimate contact of the metal carbonyl with the polymer by mixing or agitation during the course of the reaction, it is preferred that the polymer be dissolved in an inert organic solvent. Those polymers having molecular weights of below 50,000 normally have viscosity low enough to permit the bulk polymer to be used. Those polymers of higher molecular weight and especially those above 100,000 usually require solvation to obtain suitable handling and mixing characteristics. These polymers may then be used in solvents at varying proportions, while very high molecular weight polymers such as above 200,000 are commonly employed in solutions of not more than 20 weight or 10 weight percent such as from 1 to 6 weight percent.

It is preferred that relatively high concentrations of polymer in solvent be used in the preparation of modulating fluids, that is, a concentration in the range between 1 gram/100 ml. to 15 grams/100 ml. of solvent. A preferred range is 3 grams to 10 grams/100 ml. of solvent.

Suitable solvents to be employed in effecting solvation include, but are not limited to, dioxane, aliphatic and aromatic hydrocarbons like benzene, toluene, xylene, hexane, heptane, petroleum naphtha, cyclohexane, and the like, ethers such as tetrahydrofuran, 1,2-dimethoxyethane, bis(2-methoxyethyl) ether and the like; ketones like acetone, acetylacetone, methylethyl ketone, methylisobutyl ketone, cyclohexanone and the like; carbon disulfide and mixtures thereof.

The process of Ser. No. 332,302 is applicable to any unsaturated polymers or elastomers regardless of the method of polymerization employed to obtain the original starting polymer. Thus, the process can be profitably employed with those unsaturated polymers normally prepared by the use of heavy metal-organo metal catalysts such as aluminum alkyl-titanium halide systems, for example, the aluminum-triethyl-titanium tetrahalide system referred to as Ziegler catalysts or with metal alkyl-cobalt salt complex systems, as well as with alkali metal catalysts like alkyl-lithium or lithium metal catalysts or with a Friedel-Crafts catalyst like aluminum chloride, boron trifluoride and the like, as well as with those polymers commonly prepared by organic or inorganic free radical initiators or anionic or cationic emulsion polymerization techniques or any other methods.

Many such processes are described in Preparative Methods of Polymer chemistry, by W. Sorenson and T. W. Campbell, Interscience Publishers, New York (1961), while many of the polymers such as butyl rubber and GR-S are described in greater detail in Synthetic Rubber by G. S. Whitby, J. Wiley & Sons, Inc., New York, (1954).

The metal carbonyls suitable for the purposes of the process of Ser. No. 332,302 include carbonyls of Cr, Mo, Mn, Fe, Co, Ni, Ru, Rh, Os, Ir, especially carbonyls of polyvalent heavy metals and particularly those Group VIII transition metal carbonyls of iron, cobalt and nickel and their substituted derivatives, and combinations and mixtures thereof. Of particular preference are iron carbonyl compounds due to their availability, relatively low cost, stability and low toxicity characteristics. The metal carbonyl employed can be in monomeric or polymeric form, substituted or unsubstituted, with those stable unsubstituted carbonyls and hydrocarbon substituted carbonyls, especially those containing at least two replaceable carbonyl groups, being of particular significance.

The metal carbonyls can contact the unsaturated polymer in any desired physical form such as a liquid, as with $Fe(CO)_5$; as a gas or sublimate vapor, as with $Fe(CO)_5$; or as a solid, as with $Fe_3(CO)_{12}$ and $Fe_2(CO)_9$; or any combinations thereof. Many carbonyls sublimate, and therefore these carbonyls may initially contact the polymer as a solid and subsequently, depending upon the reaction conditions, sublimate to a vapor during the course of the reaction.

It is preferred that the intermediate metal complex polymer be prepared from iron carbonyl. Other carbonyls in excess can be then added so that an iron carbonyl is at the unsaturated site and other metals such as listed above are "clumped" in groups on the iron carbonyl.

Nonlimiting examples of suitable metal carbonyl compounds include those monomeric, dimeric, trimeric and tetrameric carbonyls having from 4 to 12 carbonyl groups, e.g., 4 to 8 carbonyl groups, wherein the carbonyl groups are bonded directly to the metal such as those unsubstituted metal carbonyls like iron pentacarbonyl, di-iron nonacarbonyl, tri-iron dodecacarbonyl, dicobalt octacarbonyl, tetracobalt dodecacarbonyl, nickel tetracarbonyl and the like.

Suitable substituted metal carbonyls include those carbonyls having one or more substituent groups or electron donating ligands bonded to the metal atom of the carbonyl compound such as hydrocarbon groups like unsaturated hydrocarbons like butadiene, 1,3 - octadiene, acetylene, propylene, alicyclic conjugated dienes like cyclopentadiene, cyclooctatetraene, $C_1$ to $C_3$ alkyl substituted cyclopentadiene and the like. Nonlimiting examples of substituted carbonyls include 1,3-butadiene-iron tricarbonyl, cyclooctatetraene-iron tricarbonyl, cyclopentadienyl cobalt dicarbonyl dicyclopentadienyl di-iron tetracarbonyl, acetylene dicobalt hexacarbonyl and the like and combinations thereof.

A further class of suitable carbonyl compounds includes the neutral and anionic metal carbonyl hydrides wherein one, two, three, four or more hydrogens, as well as carbon monoxide, are bonded directly to the metal, or a combination of hydrocarbons, carbon monoxide and other ligand substituents are bonded directly to the metal as well as the hydrogen. Suitable transition metal carbonyls include the neutral cobalt tetracarbonyl monohydride $HCo(CO)_4$, the neutral iron tetracarbonyl dihydride $H_2Fe(CO)_4$, the anionic bis iron octacarbonyl monohydride $[HFe_2(CO)_8]$, the anionic tris iron undecane carbonyl monohydride $[HFe_3(CO)_{11}]$, the anionic iron tetracarbonyl monohydride and the like. Also suitable for the purposes of this invention are the neutral salts of the anionic metal carbonyl hydrides. Suitable basic or neutralizing reagents for reaction with the anionic metal carbonyl hydrides include the alkali, alkaline earth and heavy metal oxides and hydroxides, ammonia, amines, such as fatty acid amines, alkyl amines like ethyl amine, polyamines like alkylene diamines, hydroxy amines, quaternary ammonium hydroxides, and the like. An example of a suitable neutral salt formed by the reaction of an alkyl amine with the anionic metal hydride carbonyl would be $[C_2H_5NH]+[HFe_3(CO)_{11}]^-$.

Other nonlimiting examples of mixed metal carbonyl hydrocarbon hydrides include, for example, cyclopentadienyl iron dicarbonyl hydride, butadiene cobalt carbonyl hydride. Other suitable ligands include phosphines like triphenyl phosphine, arsines, amines, halides, isonitriles, cyanides and the like.

The invention can be more fully understood by reference to the following drawings wherein.

Figure 1:
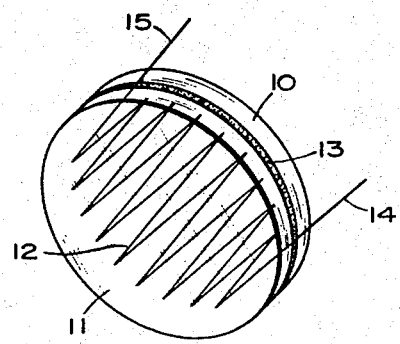
FIGURE 1 is a side angle view of a thin film magnetic polymer electromagnetic valve or modulator cell employing the glass disc and "waffle" wire concept.

FIGURE 1 is now referred to. A thin film magnetic polymer radiation valve or modulator cell is formed by joining two glass discs 10 and 11 along a common face. The interfacial area contains an electrical conducting means, such as a wire 12 which zigzags along the interfacial surface between the two discs. The amount of turns in the wire is governed by the limitation that no more than 50% of the interfacial cross-sectional area should be covered by the wire. A thin film of the magnetic polymer liquid is present on the interfacial surface of the two discs. The interfacial circumference is sealed off by means of an adhesive layer 13 so as to preserve the liquid polymer within the glass discs. The ends of wire 12 protrude from the disc surfaces at 14 and 15 thereby forming conductive leads which allow the wire 12 to be linked up with an external electric circuit.

Figure 2:
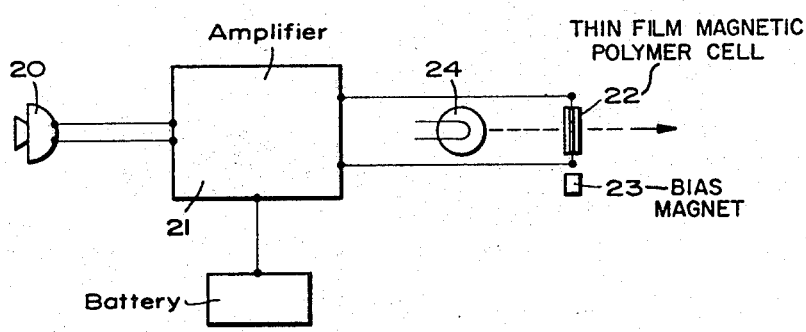
FIGURE 2 is a schematic of the transmitting portion of a portable audio-optical communication apparatus illustrating a specific embodiment of a practical utility for the thin film electromechanical radiation valve modulator of the present invention, as well as illustrating a system for transmitting and receiving signals, particularly voice signals.
Figure 3:
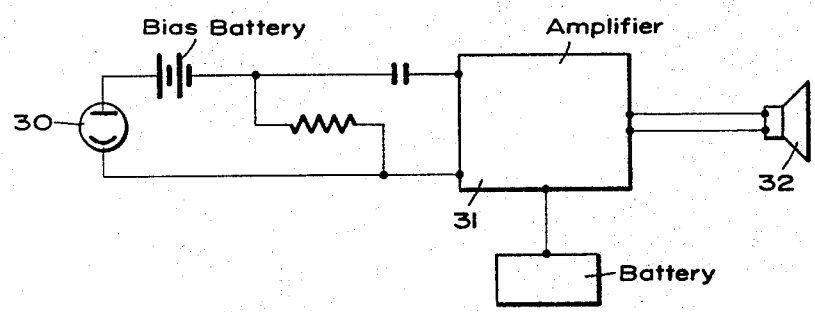
FIGURE 3 is a schematic of the receiving portion of a portable audio-optical communication apparatus illustrating the embodiment touched upon above for FIGURE 2.

Turning now to FIGURES 2 and 3, a schematic of a specific apparatus for audio communication is shown. This apparatus has two subassemblies; one is the transmitting subassembly of FIGURE 2 and the other is receiver subassembly of FIGURE 3.

The subassembly of FIGURE 2 comprises in combination a microphone 20, a power amplifier 21 and the thin film magnetic polymer cell 22 containing the ferromagnetic colloid. The leads of cell 22 are connected to amplifier 21. A biasing magnet 23 is positioned with respect to cell 22 so that its field is parallel to the direction of light. However, the biasing magnet would not be needed if biasing is accomplished by use of direct current through the same wire, as indicated previously. Light source 24 supplies electromagnetic radiation which is to be passed through cell 22. In practice the light can be an ordinary flashlight or searchlight.

The subassembly of FIGURE 3 comprises in combination a photoelectric cell 30, electronic circuit means connecting cell 30 with power amplifier 31, which in turn is connected to speaker 32. The resistor in this schematic is the normal load resistor for a photocell. Preferably the photoelectric cell 30 is mounted in the focus point of a parabolic reflector. The power amplifiers 21 and 31 for both subassemblies are flashlight battery operated.

Using the thin films of colloidal solutions of ferromagnetic polymers, which have been described previously herein, the above circuits will preferably operate within the range of about D.C. to about $10^6$ c.p.s.

One of the outstanding advantages of the thin film magnetic polymer cell of the present invention lies in the fact that it will have a wider band width potential than the types described in Ser. No. 332,302. This is a very important advantage since for even very small units the thin film, "waffle" wire cell will transmit even very high frequencies since it avoids the problem of inductance limiting impedances.

The use of this communication apparatus will be highly desirable in situations where communications must not be picked up or jammed by unwanted parties. The apparatus can be used, for instance, in ship-to-ship, plane-to-plane, tank-to-tank or man-to-man communications. It offers particular advantages in military communications.

The invention is further illustrated by the following example. The experimental setup was similar to that schematically illustrated in FIGURES 2 and 3. A length of No. 30 copper wire was formed into about twenty-five folds so as to approximate the "pleated" or "waffle" design. This wire was then inserted between two glass slides having a diameter of about 3 inches and a thickness of about 1/16 inch. The slides were then cemented on three sides and a magnetic liquid polymer, as a 3% solution in chloroform, was then introduced in between the slides via the uncemented side.

The magnetic polymer was prepared as follows: Ten grams of cis-1-4 polybutadiene having a viscosity-average molecular weight of about 200,000 were dissolved in 500 cc. of xylene and 50 cc. dioxane. Thirty cubic centimeters of iron pentacarbonyl were added to this solution and after 4 hours reflux at about 135° C. another 30 cc. increment was added, followed by a third increment of 30 cc. after 4 more hours. The reaction mixture was then refluxed for an additional 48 hours after the addition of the third increment. During the entire reaction, the reaction mixture was stirred with a magnetic stirrer having a surface magnetic field of about 400 oersteds.

The cell was then placed between the light source and the photoelectric cell, which in this particular embodiment was a photodiode. Light from the light source reached the diode by passing through the modulating cell containing the "waffle" wire. A 60 c.p.s. signal of about 1 amp RMS was put through the transmitter circuit and the thin film cell was observed to modulate the light at twice the applied frequency (i.e., 120 c.p.s.). When a small permanent magnet was held near the cell at an angle of 45°, the modulation was observed to occur at 60 c.p.s.

Although the invention has been described with some degree of particularity, it will be understood that numerous variations in details and construction are contemplated and are within the scope of the invention as claimed in the following claims.

What is claimed is:
1. An electromagentic radiation modulator comprising in combination:
    (a) an enclosure means having the property wherein at least one plane thereof is capable of passing a beam of electromagnetic radiation therethrough;
    (b) a relatively thin film of magnetic metallo-polymeric, ferromagnetic particles formed from the reaction of unsaturated polymers with Group VIII transition metal carbonyls held within said enclosure means in such manner so as to intersect said beam of electromagnetic radiation;
    (c) electrical conducting means held within said enclosure means so as to be embedded within said thin film of magnetic metallo-polymeric, ferromagnetic particles for at least a portion of the area wherein said thin film intercepts said electromagnetic radiation, said electrical conducting means being so arranged and constructed so as to generate a magnetic field in said area of said thin film when an electrical current is passed through said electrical conducting means;
wherein the transmissibility of said thin film for said electromagnetic radiation will change as a function of the electrical current being passed through said conducting means.

2. A modulator according to claim 1 which also comprises a magnetic means for creating a steady flux within said thin film, said flux direction being variable with respect to the direction of the path of electromagnetic radiation through said thin film.

3. A modulator according to claim 1 wherein said unsaturated polymer is polybutadiene having a viscosity average molecular weight of 1,000 to 1,000,000.

4. A modulator according to claim 3 wherein said thin film comprises a solvent which is substantially permeable to said electromagnetic radiation.

5. An electromagnetic radiation valve comprising in combination:
    (a) an enclosure formed by joining two discs in a face to face configuration, said discs having the property of being permeable to electromagnetic radiation for at least a portion of their areas:
    (b) a thin film of magnetic metallo-polymeric, ferromagnetic particles formed from the reaction of unsaturated polymers with Group VIII transition metal carbonyls held within the interfacial area between said two discs and substantially filling said interfacial area in the area where said discs permit the passage of said radiation;
    (c) electrical conducting means held within said thin film in said interfacial area between said two discs, said conductor being so arranged and constructed so as to generate a magnetic field substantially throughout said interfacial area when an electrical current is passed through said electrical conducting means, the thickness and length of said electrical conducting means being selected so as to occupy no more than about 50% of the cross-sectional area of said interfacial area wherein electromagnetic radiation is permitted to pass.

6. An electromagnetic radiation valve of claim 5 wherein said discs are glass and said radiation is light and said electrical conducting means comprises a conductive wire which runs back and forth across the said interfacial area so as to form a "waffle" pattern, said conductive wire being further characterized in having leads external to said two glass discs which leads are adapted to be connected to an electrical circuit.

7. An electromagnetic radiation valve according to claim 6 wherein said unsaturated polymer is polybutadiene having a viscosity-average molecular weight of 1,000 to 1,000,000 and said magnetic metallo-polymeric ferromagnetic particles are dispersed in a solvent said solvent selected from the group consisting of carbon tetrachloride dioxane and mixtures thereof, wherein the concentration of said particles in said solvent is in the range of about 1% to about 15%.

8. An electromagnetic modulator apparatus comprising in combination:
    (a) a thin liquid film-holding means;
    (b) a magnetic metallo-polymeric ferromagnetic film contained in said holding means;
    (c) means defining a pathway for electromagnetic radiation through said holding means and said magnetic metallo-polymeric ferromagnetic film contained therein;
    (d) electrical conducting means within said holding means and embedded within said ferromagnetic film whereby said electrical conducting means creates a magnetic field in said ferromagnetic film when said conducting means is subjected to an electric current.

9. An apparatus according to claim 8 wherein said thin liquid film holding means comprises two discs joined in a face to face configuration and said cavity comprises the interfacial area between said discs.

10. An apparatus according to claim 8 wherein said electrical conducting means runs back and forth across the said interfacial area in a "waffle" pattern.

11. In a thin film magnetic radiation modulator the combination comprising
    (a) an enclosure formed by two surfaces held in face to face configuration, said surface having the property of being permeable to electromagnetic radiation for at least a portion of their area,
    (b) a magnetic metallo-polymeric ferromagnetic film held within said enclosure, and
    (c) an electrical conductor embedded within said polymeric ferromagnetic film said conducting subjecting said thin film to a variable magnetic field upon passage of a variable current through said conductor.

References Cited
UNITED STATES PATENTS

| | | |
|---|---|---|
| 1,963,496 | 6/1934 | Land. |
| 2,030,235 | 2/1936 | Walton. |
| 2,143,095 | 1/1939 | Thomas. |
| 2,557,974 | 6/1951 | Kibler _____ 250—199 |
| 3,215,038 | 11/1965 | Heller et al. |
| 3,245,314 | 4/1966 | Dillon _____ 250—199 |

ROBERT L. GRIFFIN, *Primary Examiner.*

A. MAYER, *Assistant Examiner.*

U.S. Cl. X.R.

332—7.51